United States Patent [19]

Ishiwata

[11] Patent Number: 4,514,980
[45] Date of Patent: May 7, 1985

[54] HYDRAULIC RESERVOIR FOR TANDEM MASTER CYLINDER

[75] Inventor: Ichiro Ishiwata, Kanagawa, Japan

[73] Assignee: Nippon Air Brake Co., Ltd., Kobe, Japan

[21] Appl. No.: 455,243

[22] Filed: Jan. 3, 1983

Related U.S. Application Data

[63] Continuation of Ser. No. 191,929, Sep. 29, 1980, abandoned.

[30] Foreign Application Priority Data

Oct. 22, 1979 [JP] Japan .................... 54-146658[U]

[51] Int. Cl.³ ........................................... B60T 17/22
[52] U.S. Cl. ..................................... 60/534; 60/592
[58] Field of Search .............. 60/534, 535, 562, 585, 60/592

[56] References Cited

U.S. PATENT DOCUMENTS

| | | | |
|---|---|---|---|
| 3,744,513 | 7/1973 | Leitenberger | 137/255 |
| 3,879,947 | 4/1975 | Gaiser | 60/535 |
| 3,989,056 | 11/1976 | Reinartz | 60/585 |
| 4,026,319 | 5/1977 | Pickering | 137/255 |
| 4,147,270 | 4/1979 | Brandon, Jr. | 60/592 |
| 4,166,431 | 9/1979 | Pickering | 60/534 |
| 4,170,877 | 10/1979 | Pickering | 60/592 |
| 4,185,750 | 1/1980 | Op den Camp | 60/592 |
| 4,217,922 | 8/1980 | Come | 60/592 |

FOREIGN PATENT DOCUMENTS

| | | | |
|---|---|---|---|
| 2135576 | 1/1973 | Fed. Rep. of Germany | 60/585 |
| 130766 | 10/1979 | Japan | 60/585 |
| 112401 | 8/1980 | Japan | 60/585 |
| 1503063 | 3/1978 | United Kingdom | 60/535 |

*Primary Examiner*—Abraham Hershkovitz
*Attorney, Agent, or Firm*—McDougall, Hersh & Scott

[57] ABSTRACT

A hydraulic reservoir for tandem master cylinder includes a body formed by upper, lower and side walls, two brake fluid reserving chambers formed by two partitioning walls in the body, and oblong passages formed by the side walls and ancillary walls integrally formed with the partitioning walls to make the two brake fluid reserving chambers communicate with each other, the oblong passages being open to the two brake fluid reserving chambers, respectively, having bottoms higher by a predetermined length than the lower wall, and having at least such length that a flow amount of brake fluid between the two brake fluid reserving chambers is limited to a predetermined value on the inclination of the brake fluid level relative to the body.

12 Claims, 8 Drawing Figures

HYDRAULIC RESERVOIR FOR TANDEM MASTER CYLINDER

This is a continuation of application Ser. No. 191,929, filed Sept. 29, 1980, now abandoned.

BACKGROUND OF THE INVENTION

1. Field of the Invention

This invention relates to a hydraulic reservoir for tandem master cylinder, and more particularly to a hydraulic reservoir for tandem master cylinder for a vehicle braking system having at least two braking circuits.

2. Description of the Prior Art

Generally, two separate brake fluid pressure generating chambers are formed in the interior of a tandem master cylinder. Two hydraulic reservoirs are mounted on the tandem master cylinder in order to supply brake fluid into the two separate brake fluid pressure generating chambers. However, recently one hydraulic reservoir having two outlets has been used for supplying brake fluid into the two brake fluid pressure generating chambers of the tandem master cylinder.

The hydraulic reservoir having two outlets includes a body formed by upper, lower and side walls, two brake fluid reserving chambers formed by partitioning members in the body and passages which make the two brake fluid reserving chambers communicate with each other at a predetermined level, and as occasion demands, a fluid level sensor for warning the driver of the impermissible reduction of brake fluid.

It is required for the above described hydraulic reservoir that, when the automobile runs on the inclined roadway, such excessive brake fluid flow does not occur between the brake fluid reserving chambers that brake fluid is one-sidedly received by one of the brake fluid reserving chambers, and the fluid level sensor erroneously operates.

When a brake fluid conduit connected to the one brake fluid pressure generating chamber of the master cylinder is damaged or cracked by springing stones, brake fluid gradually leaks out through the cracked portion of the brake fluid conduit, and the one brake fluid pressure generating chamber connected to the damaged brake fluid conduit from the corresponding brake fluid reserving chamber. Finally, the brake fluid decreases in the corresponding brake fluid reserving chamber so much that wheels for the damaged brake fluid conduit connected to the one brake fluid pressure generating chamber cannot be braked. In such a case, it is required that a sufficient brake fluid to brake the automobile is always reserved in the other brake fluid reserving chamber.

The reservoir for tandem master is connected to two inlets of the tandem master cylinder. Accordingly, the reservoir is long in the axial direction of the master cylinder. Particularly, when any other part such as filter is arranged in the reservoir, the latter becomes longer. More brake fluid between the brake fluid reserving chambers flow in the longer reservoir, when the latter is inclined.

SUMMARY OF THE INVENTION

An object of this invention is to provide a novel hydraulic reservoir for master cylinder which fulfils well the above described requirements.

Another object of this invention is to provide a hydraulic reservoir for tandem master cylinder in which brake fluid flow between two brake fluid reserving chambers can be more reduced in the fluid level inclination relative to the reservoir.

A further object of this invention is to provide a hydraulic reservoir for tandem master cylinder in which, even when one of the two brake fluid reserving chambers becomes empty because of a damage of the brake fluid conduit, a sufficient brake fluid to brake the automobile is always held in the other of the two brake fluid reserving chambers.

A still further object of this invention is to provide a hydraulic reservoir for tandem master cylinder in which, even when the automobile runs on the inclined roadway, a fluid level sensor can accurately operate.

In accordance with an aspect of this invention, a hydraulic reservoir for tandem master cylinder includes: (A) a body formed by upper, lower and side walls; (B) two brake fluid reserving chambers formed by partitioning means in the body; (C) oblong passages formed by the side walls and ancillary walls integrally formed with the partitioning means to make the two brake fluid reserving chambers communicate with each other, the oblong passages being open to the two brake fluid reserving chambers, respectively, having bottoms higher by a predetermined length than the lower wall, and having such length that a flow amount of brake fluid between the two brake fluid reserving chambers is limited to a predetermined value on the inclination of the brake fluid level relative to the body.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Next, hydraulic reservoirs for tandem master cylinder according to embodiments of this invention will be described with reference to the drawings.

Figure 1:
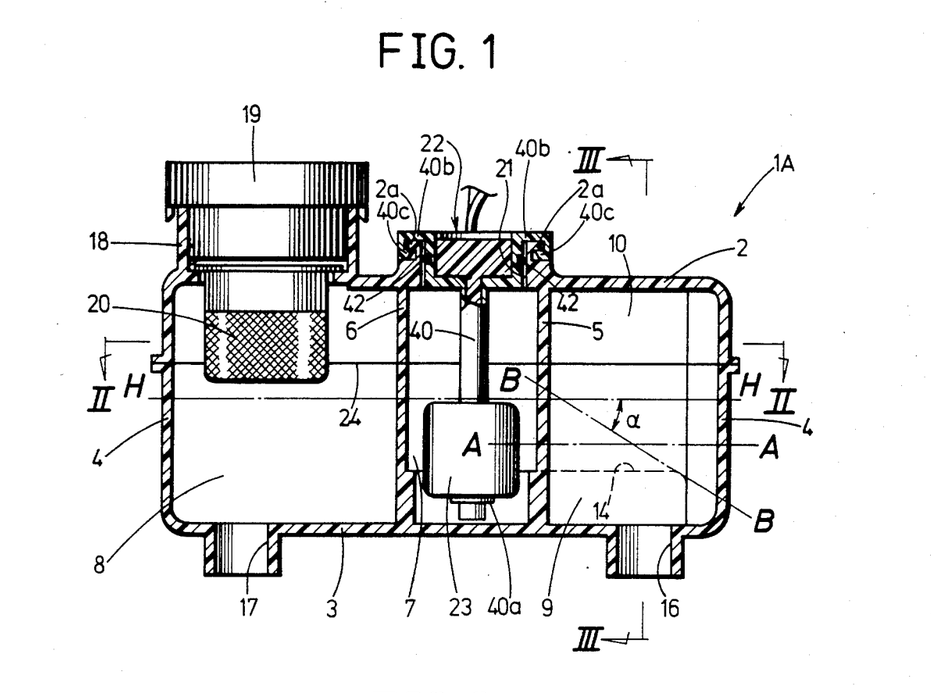
FIG. 1 is a partly broken-away cross-sectional view of a hydraulic reservoir according to a first embodiment of this invention.
Figure 2:
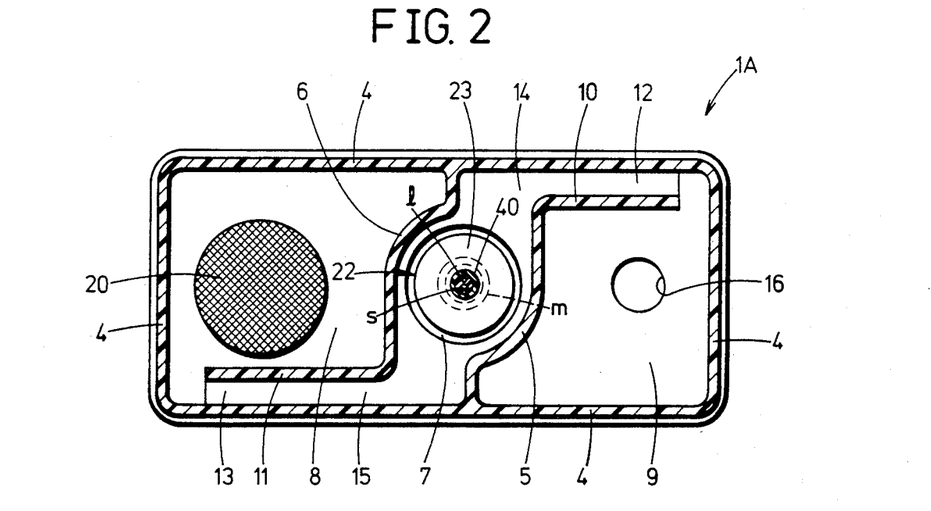
FIG. 2 is a cross-sectional view taken along the line II—II on FIG. 1.
Figure 3:
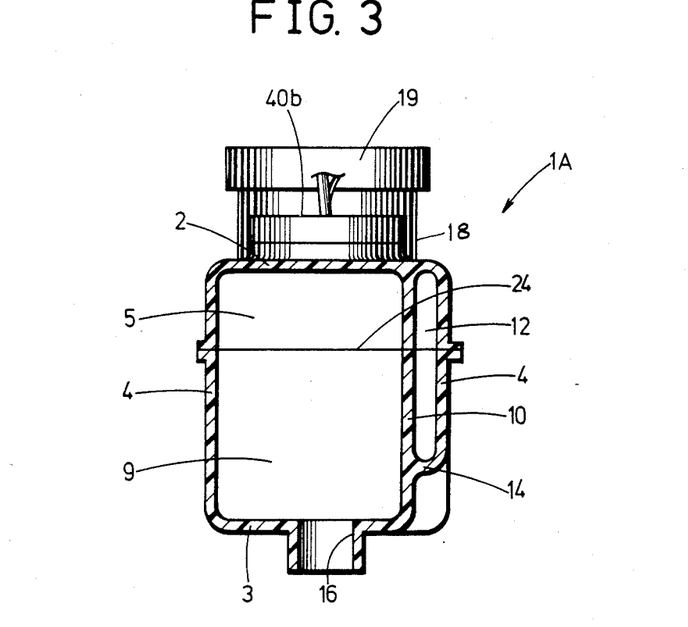
FIG. 3 is a cross-sectional view taken along the line III—III on FIG. 1.

FIG. 1 to FIG. 3 shows a hydraulic reservoir 1A for tandem master cylinder, according to a first embodiment of this invention. FIG. 1 is a partly broken-away cross-sectional side view of the hydraulic reservoir 1A. FIG. 2 is a cross-sectional view taken along the line II—II on FIG. 1. FIG. 3 is a cross-sectional view taken along the line III—III on FIG. 1. Referring to FIG. 1 to FIG. 3, the hydraulic reservoir 1A is generally in the shape of rectangular parallelepiped. It is constructed by an upper wall 2, a lower wall 3 and side walls 4 which are integrally formed, for example, of synthetic resin. In the manufacture of the hydraulic reservoir 1A, an upper portion including the upper wall 2 is welded to a lower portion including the lower wall 3. A line 24 represents the welding line between the upper and lower portions. The interior of the hydraulic reservoir 1A is divided into three chambers, namely float chamber 7 and brake fluid reserving chambers 8 and 9, by vertical partitions 5 and 6 which are integrally formed with the upper wall 2, lower wall 3 and side walls 4. As clearly shown in FIG. 2, the partitions 5 and 6 curvedly extend from the side walls 4, respectively. The float chamber 7 is formed between the partitions 5 and 6. One 8 of the brake fluid reserving chambers is formed between the side wall 4 and one of the partitions. Another 9 of the brake fluid reserving chambers is formed between the side wall 4 and another of the partitions. Ancillary walls 10 and 11 parallel to the side walls 4 are integrally formed with the partitions 5 and 6, respectively. Oblong or slit-like passages 12 and 13 are formed by the side walls 4 and the ancillary walls 10 and 11. The float chamber 7 and the brake fluid chambers 8 and 9 communicate with each other only thorugh the oblong passages 12 and 13. As clearly shown in FIG. 3, the side walls 4 are inwardly bent at a predetermined level with respect to the lower wall 3. Accordingly, bottoms 14 and 15 of the oblong passages 12 and 13 are higher by the predetermined level than the lower wall 3. The ancillary walls 10 and 11 extend from the bottoms 14 of the passages 12 and 13 to the upper wall 2.

In the brake fluid reserving chambers 8 and 9, outlet branches 16 and 17 are formed in the lower wall 3, and they are fluid-tightly connected to brake fluid pressure generating chambers of a tandem master cylinder (not shown). A filler neck 18 is formed above the one brake fluid reserving chamber 8 in the upper wall 2. The filler neck 18 is used for replenishing brake fluid. A filter 20 which is well known, is mounted on an opening formed in the filler neck 18. A cap 19 is fluid-tightly fitted into the filler neck 18, which has a well-known structure.

A fluid level sensor 22 is received in the float chamber 7, and it consists of a pipe member 40, a reed switch S connected to a lead wire 1 in the pipe member 40, a float 23 slidably fitted to the pipe member 40 and a permanent magnet m fitted to the inner circumferential surface of the float 23. A stopper member 40a is integrally formed with the lower end of the pipe member 40. Brake fluid is not contained in the shown reservoir 1A. Accordingly, the shown float 23 contacts with the stopper member 40a. A filler portion 40b having larger diameter is integrally formed with the upper end of the pipe member 40, and it is fluid-tightly fitted into an opening 21 of a filler neck 2a formed in the upper wall 2. A seal ring 42 is fitted to the circumferential surface of the filler portion 40b. Hooks 4c formed in the upper edge of the filler portion 40b are clicked to an annular groove formed in the filler neck 2a. The lead wire 1 and the read switch S are molded with thermoplastic resin in the pipe member 40. The reed switch S is positioned at a predetermined level which is slightly higher than the bottoms 14 and 15 of the oblong passages 12 and 13.

Although not shown, a power source and warning means such as a lamp are connected to the lead wire 1 outside of the reservoir 1A.

As described hereinafter, the oblong passages 12 and 13 are so long that, even when brake fluid leaks from the brake system for the one brake fluid reserving chamber 8 or 9, sufficient brake fluid to brake the automobile is always reserved in the other brake fluid reserving chamber 8 or 9.

Next, operations of the above described hydraulic reservoir 1A will be described.

It is assumed that the hydraulic reservoir 1A contains brake fluid to a fluid level A—A in the horizontal attitude. The fluid level A—A is higher than the bottoms 14 and 15 of the oblong passages 12 and 13. Since the brake fluid reserving chambers 8 and 9, and the float chamber 7 communicate with each other through the oblong passages 12 and 13, the fluid levels in the chambers 7, 8 and 9 are equal to each other, namely the fluid level A—A. When the automobile is inclined, or rapidly decelerated or accelerated, the fluid level A—A is inclined relative to the reservoir 1A, and some brake fluid flows from one of the brake fluid reserving chambers 8 and 9 to the other of the brake fluid reserving chambers 8 and 9 through the oblong passages 12 and 13. However, the flow amount into the other chamber is very little because of the positions of the bottoms 14 and 15 of the oblong passages 12 and 13. For example, when the automobile, and therefore the reservoir 1A is inclined at an angle of α in the counter-clockwise direction (FIG. 1) relative to a horizontal line H—H, the fluid levels in the chambers 7, 8 and 9 become parallel to a line B—B, and the brake fluid in the one brake fluid reserving chamber 9 is moved towards the other brake fluid reserving chamber 8. However, since the bottom 14 of the oblong passage 12 is positioned at the predetermined level higher than the lower wall 3, only a small amount of the brake fluid flows into the float chamber 7 and the other brake fluid reserving chamber 8, and the fluid level in the one brake fluid reserving chamber 9 becomes flushed with the line B—B. Accordingly, more brake fluid is restricted from flowing from the one brake fluid reserving chamber 9. Most of the brake fluid reserved in the horizontal attitude remains in the one brake fluid reserving chamber 9, although the reservoir 1A is inclined relative to the horizontal line H—H. Particularly, since the position of the opening of the oblong passage 12 to the one brkae fluid reserving chamber 9 is near one end (right end) of the reservoir 1A in its lengthwise direction, the brake fluid flowing from the one brake fluid reserving chamber 9 into the other brake fluid reserving chamber 8 thorugh the oblong passage 12 beyond the right end of the bottom 14 of the passage 12 is very little. Most of the brake fluid reserved in the horizontal attitude is moved relative to the reservoir 1A only within the space defined by the ancillary wall 10, the partition 5 and a part of the side walls 4 which is at the left hand (FIG. 1 or FIG. 2) of the opening of the oblong passage 12 to the one brake fluid reserving chamber 9.

Next, there will be described the case that brake fluid leaks out from the brake conduit system (not shown) connected to the brake fluid reserving chamber 8 for some reason or other.

The brake fluid in the brake fluid reserving chamber 8 leaks through the brake fluid preessure generating chamber of the master cylinder to the outside of the brake conduit system. The level of the brake fluid sinks down in the brake fluid chamber 8. Finally, all of the brake fluid in the brake fluid reserving chamber 8 leaks out from the brake conduit system. The brake fluid reserving chamber 8 becomes empty. On the other hand, the levels of the brake fluid sink to the level of the bottom 15 of the oblong passage 12 in the float chamber 7 and the other brake fluid reserving chamber 9. In that condition, when the level of the brake fluid is inclined relative to the reservoir 1A, or when the reservoir 1A is inclined relative to the horizontal line H—H as already described, a part of the brake fluid in the float chamber 7 flows beyond the left end (FIG. 2) of the bottom 15 of the oblong passage 13. However, the brake fluid in the other brake fluid reserving chamber 9 flows little beyond the right end (FIG. 2) of the bottom 14 of the oblong passage 12 into the float chamber 7. The brake fluid is moved only within the space defined by the ancillary wall 10, the partition 5 and a part of the side wall 4. No brake fluid flows out from the other brake fluid chamber 9. A sufficient amount of brake fluid to brake the automobile is held in the other brake fluid reserving chamber 9.

If the left side of FIG. 1 is the front side of the automobile, the above description on the inclination of the fluid level shows the case that the automobile runs downwardly facing on an inclined roadway. When the automobile runs upwardly facing on the inclined road way, the left hand of the reservoir 1A becomes higher than the right hand thereof in contrast to the above description. However, phenomenon on the brake fluid in this case is the same as above described.

The length of the ancillary walls 10 and 11 in the lengthwise direction of the reservoir 1A, and the level of the bottoms 14 and 15 of the oblong passages 12 and 13 are designed in the following manner.

An amount of brake fluid to be reserved in each of the brake fluid reserving chambers 8 and 9 should be more than the minimum amount sufficiently to brake the automobile. The minimum amount depends on the kind or type of the automobile. However, it should be so much that a piston can be moved to the maximum stroke including wear of brake shoe in a wheel cylinder of a brake control system mounted on a wheel, and that air cannot be brought into a brake fluid pressure generating chamber of a master cylinder by the reduced pressure occuring on taking off the brake. Further, the minimum amount of brake fluid depends on inner diameters of master cylinder and wheel cylinder, and piston strokes.

When the minimum amount of brake fluid is supplied into each of the brake fluid reserving chambers 8 and 9, the level of the bottoms 14 and 15 of the oblong passages 12 and 13 is higher than the level of the brake fluid in each of the brake fluid reserving chambers 8 and 9. Further, the level of the bottoms 14 and 15 of the oblong passages 12 and 13 is so designed as to be lower than a warning level at which the reed switch S of the fluid level sensor 22 is closed by action of the magnet m fixed to the float 23.

The length of the ancillary walls 10 and 11, although it depends on the shape of the reservoir 1A, is so long that, when the reservoir 1A is inclined at the largest angle possible, no brake fluid is moved beyond the bottom 14 or 15 of the oblong passage 12 or 13 from one of the brake fluid reserving chambers 8 and 9 containing the minimum amount of brake fluid into the other of the brake fluid reserving chambers 8 and 9 containing the minimum amount of brake fluid. Preferably, the ancillary walls 10 and 11 extend close to the respective ends of the reservoir 1A in its lengthwise direction, as shown in FIG. 2.

According to the above-described first embodiment, the ancillary walls 10 and 11 extend along the side walls 4 from the partitions 5 and 6 to form the oblong passages 12 and 13, and the length of the oblong passages 12 and 13 is so designed as above described. Accordingly, when the level of the brake fluid is inclined relative to the reservoir 1A, only a little of the brake fluid is moved from one of the brake fluid reserving chambers 8 and 9 into the other thereof. Further, even when the one brake conduit system connected to the one brake fluid reserving chamber 8 or 9 breaks down to make the latter empty by fluid leakage, a sufficient brake fluid to brake the automobile is always reserved in the other brake fluid reserving chamber 8 or 9.

Further, the brake fluid reserving chambers 8 and 9 communicate with each other through a crank-shaped passage defined by the oblong passages 12 and 13, and the float chamber 7. Accordingly, even when the level of the brake fluid is inclined relative to the reservoir 1A not only in its lengthwise direction, but also in its widthwise direction normal to the lengthwise direction (upward and downward directions in FIG. 2), only a little of the brake fluid is moved from the one brake fluid reserving chamber 8 or 9 into the other brake fluid reserving chamber 8 or 9, since brake fluid is restricted from flowing at a boundary between the float chamber 7 and the oblong pasage 12 or another boundary between the float chamber 7 and the oblong passage 13.

Further, since the oblong passages 12 and 13 are formed closely along the side walls 4, wide spaces are imparted to the brake fluid reserving chambers 8 and 9, respectively. A special space is not required for the filter 29 or any other parts. It is not necessary to increase the volume of the reservoir 1A for the filter 20. Accordingly, the length of the reservoir 1A can be decreased, and the flow from the one brake fluid reserving chamber 8 or 9 into the other brake fluid reserving chamber 8 or 9 can be reduced on the inclination of the brake fluid level.

Further, since the oblong passages 12 and 13 extend from the bottoms 14 and 15 to the upper wall 2 of the reservoir 1A, air is not prevented from freely flowing between the brake fluid reserving chambers 8 and 9. Air is not trapped in the brake fluid reserving chambers 8 and 9.

The width of the oblong passages 12 and 13 is so small that they show some resistance to brake fluid flow. Preferably, it is less than 5 mm. More preferably, it is within the range of 5 to 3 mm in consideration of manufacture of the reservoir 1A.

Figure 4:
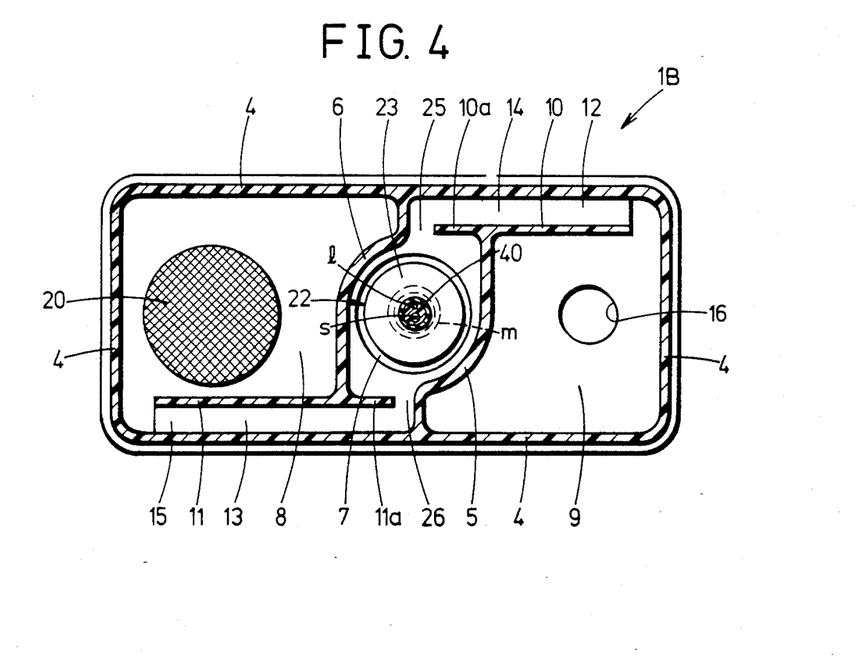
FIG. 4 is a cross-sectional view of a hydraulic reservoir according to a second embodiment of this invention, similar to FIG. 2.

FIG. 4 shows a hydraulic reservoir 1B according to a second embodiment of this invention, and it is a cross-sectional view thereof similarly to FIG. 2. Parts in FIG. 4 which correspond to thoes in FIG. 2, are denoted by the same reference numerals, the description of which will be omitted.

In this embodiment, extensions 10a and 11a are integrally formed with the ancillary walls 10 and 11. They are positioned in the boundaries between the float chamber 7 and the oblong passages 12 and 13 in the reservoir 1A of FIG. 2. Slit-like openings 25 and 26 are formed between the partition wall 6 and the extension 10a, and between the partition wall 5 and the extension 11a, respectively.

In this embodiment, brake fluid is more restricted from flowing from the float chamber 7 and into the float chamber 7, when the fluid level in the float chamber 7 is inclined relative to the reservoir 1B. Accordingly, the fluid level sensor 22 is more prevented from misoperating.

Figure 5:
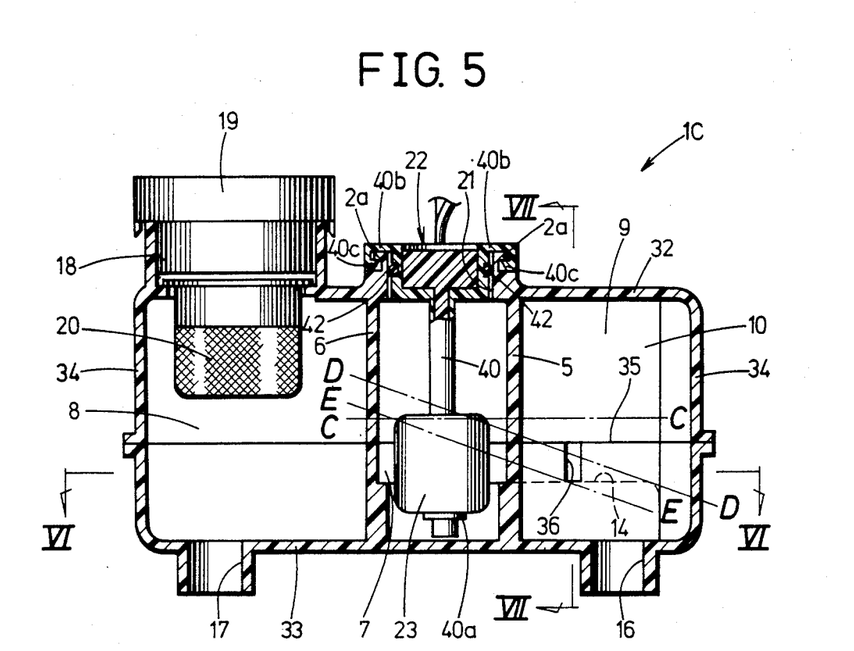
FIG. 5 is a partly broken-away corss-sectional view of a hydraulic reservoir according to a third embodiment of this invention.
Figure 6:
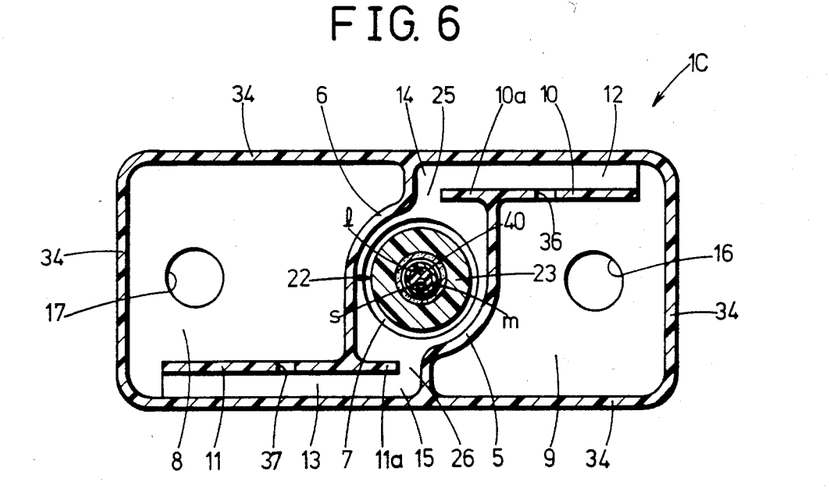
FIG. 6 is a cross-sectional view taken along the line VI—VI on FIG. 5.
Figure 7:
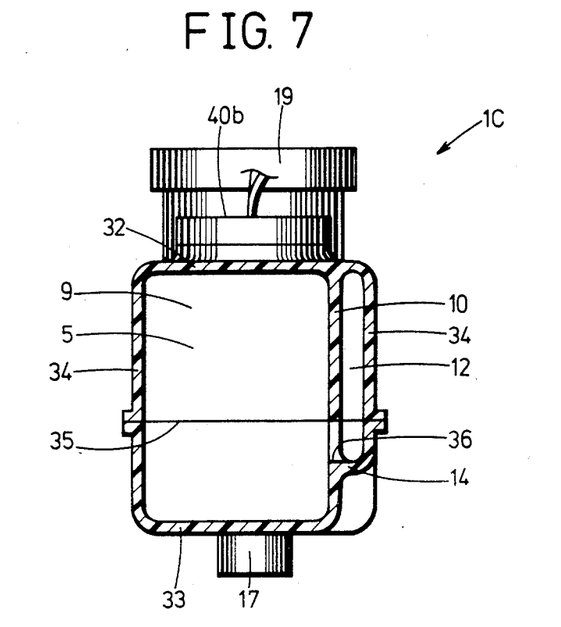
FIG. 7 is a cross-sectional view taken along the line on FIG. 5.

FIG. 5 to FIG. 7 show a hydraulic reservoir 1c according to a third embodiment of this invention.

Parts in this embodiment which correspond to those in the above embodiments, are denoted by the same reference numerals, the description of which will be omitted.

The outline of the hydraulic reservoir 1c of this embodiment is almost the same as that of the hydraulic reservoirs 1A and 1B of the above described embodiments. However, an upper half and a lower half constituting the reservoir 1c are different in size from the upper half and the lower half constituting the reservoir 1A or 1B. An upper wall 32 of the upper half is equal in size to the upper wall 2 of the upper half of the reservoir 1A or 1B, and a lower wall 33 of the lower half is equal in size to the lower wall 3 of the lower half of the reservoir 1A and 1B. However, the heights of side walls of the upper and lower halves of the reservoir 1c are different from thoes of the reservoir 1A or 1B. The upper and lower halves are welded to each other to form side walls 34 of the reservoir 1c. A level of a welding line 35 is lower than the level of the welding line 24 of the reservoir 1A or 1B.

In this embodiment, small openings 36 and 37 are made in the almost intermediate portions (refer to FIG. 6) of the ancillary walls 10 and 11 in its lengthwise direction. The small openings 36 and 37 are made on the molding of the lower half of the reservoir 1c.

The small openings 36 and 37 communicate with the oblong passages 12 and 13, and the brake fluid reserving chambers 8 and 9. They are so positioned that some brake fluid can flow from the float chamber 7 into the brake fluid reserving chambers 8 and 9 to operate the fluid level sensor 22 during the time when the automobile is inclined.

Next, there will be described operations of the hydraulic reservoir 1c.

It is assumed that the level of the brake fluid in the reservoir 1c is aligned with a line c—c in the horizontal attitude. The brake fluid reserving chambers 8 and 9, and the float chamber 7 communicate with each other through the oblong passages 12 and 13. The levels of the brake fluid in the brake fluid reserving chambers 8 and 9, and the float chamber 7 are equal to each other.

When the automobile runs on the inclined roadway, the levels of the brake fluid is inclined relative to the reservoir 1c. When the right side of the reservoir 1c is forward, the left side thereof is backward, and the automobile runs upwardly facing on the inclined roadway, the right side of the reservoir 1c becomes higher than the left side thereof. Accordingly, the levels of the brake fluid are inclined relative to the reservoir 1c. For example, they become parallel to a line D—D. The brake fluid flows from the brake fluid reserving chamber 9 through the float chamber 7 into the other brake fluid reserving chamber 8.

The brake fluid reserving chambers 8 and 9, and the float chamber 7 communicate with each other only through the oblong passages 12 and 13. The bottoms 14 and 15 of the oblong passages 12 and 13 are positioned at the predetermined level which is higher than the lower wall 33. Accordingly, when the reservoir 1c is inclined, the brake fluid flows slowly from the one brake fluid reserving chamber 9 into the float chamber 7 and the other brake fluid reserving chamber 8. If the small opening 36 is not made in the ancillary wall 10, the brake fluid flow stops at the time when the levels of the brake fluid in the one brake fluid reserving chamber 9 coincides with the line D—D. In this embodiment, brake fluid can further flow through the small opening 36, until the level of the float chamber 7 coincides substantially with a line E—E which is lower than the line D—D. However, in the normal condition that the sufficient brake fluid to brake the automobile is reserved in the brake fluid chamber 9, there is not such brake flow that the level of the brake fluid comes to coincide with the line E—E in the float chamber 7.

Next, there will be described the case that, while the automobile runs on the inclined roadway, there is some trouble to leak brake fluid in the brake conduit system connected to the brake fluid reserving chamber 9. For example, the brake conduit is damaged or broken down by springing stone or other, resulting in the trouble to leak brake fluid.

The brake fluid leaks out through the damaged brake conduit. The content of the brake fluid in the brake fluid reserving chamber 9 gradually decreases. Finally, the brake fluid reserving chamber 9 beocmes almost empty. If the small opening 36 is not made in the ancillary wall 10, the brake fluid existing below the line D—D in the oblong passage 12 cannot flow into the brake fluid reserving chamber 9, while the latter becomes almost empty. In other words, the brake fluid cannot flow from the float chamber 7 into the brake fluid reserving chamber 9. Accordingly, the float 23 of the fluid level sensor 22 cannot move down, after the fluid level becomes aligned with the line D—D. The fluid level sensor 22 does not become operative to light the warning lamp (not shown).

However, in this embodiment, when the brake fluid decreases in the brake fluid reserving chamber 9 because of the trouble of the brake conduit system on the inclined roadway, some brake fluid flows from the float chamber 7 and oblong passage 12 into the brake fluid reserving chamber 9, and the brake fluid decreases in the float chamber 7, until the level of the brake fluid becomes aligned with the line E—E in the float chamber 7. The reed switch S of the fluid level sensor 22 is turned on by the magnet m attached to the float 23 to light the warning lamp. The driver of the automobile becomes aware of the trouble.

The above description shows the case that the automobile runs upwardly facing on the inclined roadway. However, it is clear that the same effect as above described can be obtained also in the case that the automobile runs downwardly facing on the roadway, although the left side of the reservoir 1c becomes higher than the right side of the reservoir 1c.

The position of the small openings 36 and 37 is higher than that of the bottoms 14 and 15 of the oblong passages 12 and 13, and such that, when the brake conduit system connected to the brake fluid reserving chamber 8 or 9 is troubled or damaged to leak brake fluid and to make the brake fluid reserving chamber 8 or 9 empty, some brake fluid can flow from the float chamber 7 and the oblong passage 12 or 13 into the brake fluid reserving chamber 8 or 9 connected to the troubled or damaged brake conduit system so as to operate the brake fluid level sensor 22 for lighting the warning lamp.

The level of the bottoms 14 and 15 of the oblong passages 12 and 13 is so high that the minimum amount of brake fluid to brake the automobile is always held in the brake fluid reserving chambers 8 and 9 under the normal condition of the brake conduit systems. Further, it is determined in consideration of the largest inclination angle possible which depends on the power of the automobile provided with the reservoir 1c.

Figure 8:
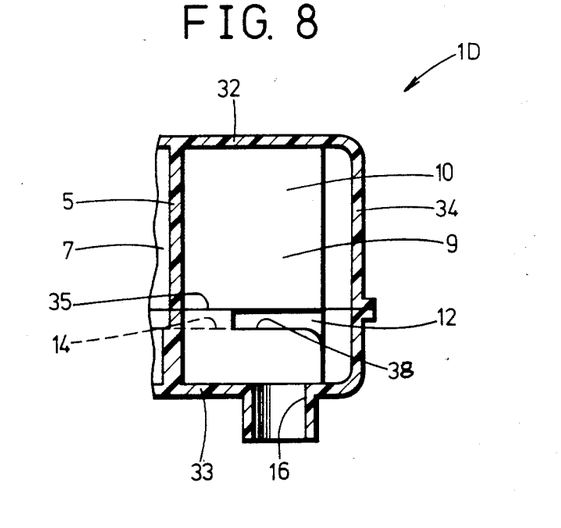
FIG. 8 is a cross-sectional view of an important part of a hydraulic reservoir according to a fourth embodiment of this invention.

FIG. 8 shows a hydraulic reservoir 1D according to a fourth embodiment of this invention, and it is a cross-sectional view of a part thereof. Parts in this embodiment which correspond to those in the above embodiment, are denoted by the same reference numerals, the description of which will be omitted.

In this embodiment, a lateral opening 38 is made in the ancillary wall 10 instead of the longitudinal opening 36 in the third embodiment. Although not shown, a lateral opening similar to the lateral opening 38 is made in the other ancillary wall 11. The upper edge of the lateral opening 38 coincides with the welding line 35. When the reservoir 1D is manufactured by a molding method, the lateral opening 38 can be more easily formed in the lower half of the reservoir 1D. However, the reservoir 1D can obtain the same effect as the reservoir 1c.

While the preferred embodiment have been described, variations thereto will occur to those skilled in the art within the scope of the present invention concepts which are delineated by the following claims.

What is claimed is:

1. A hydraulic reservoir for a tandem master cylinder comprising:
    (a) a body having an upper wall, a lower wall, first and second side walls disposed opposite each other and joining the upper and lower walls, and third and fourth side walls joining the first and second walls and the upper and lower walls,
    (b) two transversely extending partition walls spaced from each other to form a float chamber therebetween, one of said transversely extending partition walls extending from the first side wall toward the second side wall, the end of said one partition wall terminating at a point short of said second side wall, the other of said partition walls extending from said second side wall toward said first side wall with the end of said other partition wall terminating at a point short of said first side wall,
    (c) a brake fluid level sensor disposed in said float chamber, said sensor operating to indicate a predetermined brake fluid limit level for said cylinder;
    (d) two ancillary walls extending closely to and along said first and second side walls, respectively, a slit-like passage being defined between each ancillary wall and the adjacent side wall, said ancillary walls being joined, respectively, to said ends of said partition walls, one of said ancillary walls extending toward and terminating close to said third side wall, the other ancillary wall extending toward and terminating close to said fourth side wall whereby said slit-like passages terminate, respectively, close to said third and fourth side wall; and
    (e) two brake fluid reserving chambers formed within the spaces defined by said partition walls and ancillary walls and the adjacent upper, lower and side walls in said body, said slit-like passages defining bottoms positioned in a plane above the plane of said lower wall, said passages thereby defining open ends communicating with said brake fluid reserving chambers from said bottoms upwardly so that said brake fluid reserving chambers communicate with each other through said slit-like passages and through said float chamber, the plane containing said bottoms being slightly lower than said brake fluid limit level, and said slit-like passages having at least such length that the amount of flow of brake fluid between said two brake fluid reserving chambers is limited to a predetermined value upon the inclination of the brake fluid level relative to said body whereby at least a minimum amount of brake fluid sufficient to brake is secured in each of said reserving chambers upon such inclination.

2. A hydraulic reservoir for tandem master cylinder according to claim 1 further comprising openings formed in said ancillary walls for communicating said slit-like passages with said brake fluid reserving chambers, said brake fluid, to a predetermined amount, being free to flow through one of said openings from said float chamber into the corresponding one of said brake fluid reserving chambers during inclination of said body.

3. A hydraulic reservoir for tandem master cylinder according to claim 2, in which said partition walls and said ancillary walls extend from said bottoms to said upper wall whereby said open ends extend along substantially the complete vertical extent of the slit-like passages, said open ends being located close to said third and fourth side walls, respectively.

4. A hydraulic reservoir for tandem master cylinder according to claim 1 in which said slit-like passages and said float chamber constitute a crank-shaped passage.

5. A hydraulic reservoir for tandem master cylinder according to claim 1 including extensions of said ancillary walls extending toward an opposing partition wall, said extensions and opposing partition walls defining openings of slit-like shape which communicate said slit-like passages with said float chamber.

6. A hydraulic reservoir for tandem master cylinder according to claim 5 in which said body consists of an upper portion including said upper wall, and a lower portion including said lower wall, said upper and lower portions being formed of synthetic resin and being welded to each other to constitute said body.

7. A hydraulic reservoir for a tandem master cylinder according to claim 5, in which the bottom of said slit-like passages are formed by bending said first and second side walls at a predetermined height with respect to said lower wall of the body.

8. A hydraulic reservoir for tandem master cylinder according to claim 1, in which said partition walls and said ancillary walls extend from said bottoms to said upper wall whereby said open ends extend along substantially the complete vertical extent of the slit-like passages, said open ends being located close to said third and fourth side walls, respectively.

9. A hydraulic reservoir for tandem master cylinder according to claim 8 in which said body consists of an upper portion including said upper wall, and a lower portion including said lower wall, said upper and lower portions being formed of synthetic resin and being welded to each other to constitute said body.

10. A hydraulic reservoir for tandem master cylinder according to claim 8 in which the bottom of said slit-like passages are formed by bending said first and second side walls at a predetermined height with respect to said lower wall of the body.

11. A hydraulic reservoir for tandem master cylinder according to claim 1, in which said brake fluid level sensor comprises a reed switch, a float member slideably guided by a pipe containing said reed switch and a permanent magnet attached to said float member, said brake fluid limit level being determined by the position of said reed switch, said brake fluid limit level being higher than said bottoms of the slit-like passages.

12. A hydraulic reservoir for tandem master cylinder according to claim 1, in which a filler neck for supplying brake fluid is formed in said upper wall above one of said brake fluid reserving chambers, and a filter supported by said filler neck positioned within the space of said one of the brake fluid reserving chambers.

* * * * *